United States Patent
Narayanan et al.

(10) Patent No.: US 10,095,571 B2
(45) Date of Patent: Oct. 9, 2018

(54) SYSTEM AND METHOD FOR MANAGING DEVICES RELAYED VIA AN ESTABLISHED SESSION

(71) Applicant: SmarterHi Communications Private Limited, Pune (IN)

(72) Inventors: Srinivasan Narayanan, Pune (IN); Pradeep Vasudev, Pune (IN)

( * ) Notice: Subject to any disclaimer, the term of this patent is extended or adjusted under 35 U.S.C. 154(b) by 157 days.

(21) Appl. No.: 15/397,799

(22) Filed: Jan. 4, 2017

(65) Prior Publication Data

US 2017/0192835 A1 Jul. 6, 2017

(30) Foreign Application Priority Data

Jan. 4, 2016 (IN) .............................. 201621000236

(51) Int. Cl.
*G06F 11/00* (2006.01)
*G06F 11/07* (2006.01)
*H04L 12/24* (2006.01)

(52) U.S. Cl.
CPC ........ *G06F 11/079* (2013.01); *G06F 11/0709* (2013.01); *H04L 41/06* (2013.01); *H04L 41/0809* (2013.01); *H04L 41/28* (2013.01); *H04L 41/0893* (2013.01)

(58) Field of Classification Search
CPC ...... G06F 21/53; G06F 21/566; G06F 3/0605; G06F 9/44526; H04L 41/0816; H04L 47/20; H04L 67/14
See application file for complete search history.

(56) References Cited

U.S. PATENT DOCUMENTS

| | | | | |
|---|---|---|---|---|
| 7,702,739 B1* | 4/2010 | Cheng | ..................... | H04L 47/10 709/203 |
| 9,390,172 B2* | 7/2016 | Schleifer | ................. | G06F 9/541 |
| 9,443,077 B1* | 9/2016 | Dingle | .................. | G06F 21/566 |
| 9,756,120 B2* | 9/2017 | Teibel | ........................ | G06F 8/65 |
| 2004/0052045 A1* | 3/2004 | Botchek | .................. | G06F 1/181 361/679.21 |
| 2006/0173978 A1* | 8/2006 | Palm | ................... | H04L 41/0806 709/220 |
| 2007/0105554 A1* | 5/2007 | Clark | ...................... | H04W 4/12 455/435.1 |
| 2010/0122271 A1* | 5/2010 | Labour | ............... | G06F 9/44526 719/328 |

(Continued)

*Primary Examiner* — Loan L. T. Truong
(74) *Attorney, Agent, or Firm* — The Law Office of Austin Bonderer, PC; Austin Bonderer

(57) ABSTRACT

The embodiments herein provide a system and a method managing, auditing and troubleshooting an IP device. The system comprises a bridge device that (a) initiates a first secure connection with, or responds to a connection request from an admin device, (b) connects to a device registry and downloads information associated with the IP device, (c) downloads and installs a connector to connect with the IP device as a plug-in module, (d) forms or joins a second secure connection with the agent device to manage, audit and troubleshoot IP device, (e) forms, on approval from the admin device, a third secure connection, between the bridge device and the IP device and (f) secures and relays information from the second secure connection to the third secure connection when the second secure connection and the third secure connection are connected together.

20 Claims, 10 Drawing Sheets

(56) References Cited

U.S. PATENT DOCUMENTS

| | | | |
|---|---|---|---|
| 2010/0135296 A1* | 6/2010 | Hwang | H04L 12/1836 370/390 |
| 2010/0281107 A1* | 11/2010 | Fallows | G06F 9/54 709/203 |
| 2016/0112429 A1* | 4/2016 | Sundaresan | H04L 63/08 726/4 |

* cited by examiner

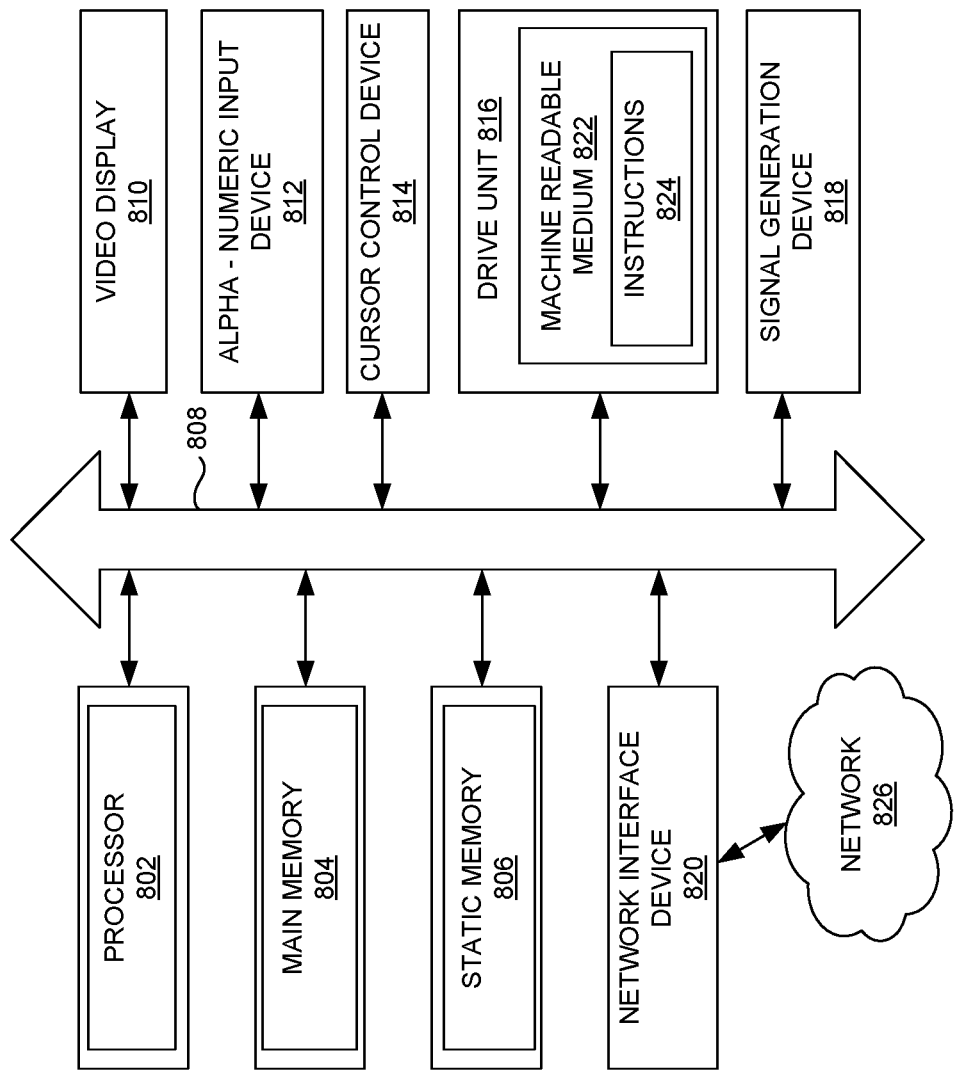

SYSTEM AND METHOD FOR MANAGING DEVICES RELAYED VIA AN ESTABLISHED SESSION

BACKGROUND

Technical Field

The embodiments herein generally relate to managing of devices, and, more particularly, to a system and a method for managing, auditing and troubleshooting IP devices through an established session.

Description of the Related Art

Pursuant to an exemplary scenario IP devices refer to a network of physical objects or "things" embedded with electronics, software, sensors, and network connectivity that enables the objects to collect and exchange data. The IP devices allow objects to be sensed and controlled remotely across existing network infrastructure while creating opportunities for more direct integration between the physical world and computer-based systems. The IP devices may include servers, an automated teller machine (ATM) and IOT devices etc. Each object in the IP devices may be uniquely identifiable through its embedded computing system but may also be able to interoperate within the existing internet infrastructure. The IP devices are based on network systems that enable intelligent communication by performing network matching between devices in a home network and an external communication network. The IP devices are configured to constitute an enterprise network and/or a home network which may include information-based devices, such as a personal computer (PC), a facsimile, a scanner, or a printer, audio/video (A/V) devices, such as a television (TV), a set top box, a digital versatile disc (DVD), a video cassette recorder (VCR), an audio, a camcorder, or a home game machine, control-based devices, such as a coffee machine, an electronic rice cooker, a refrigerator, a washing machine, a microwave oven, or a camera, other devices, such as a remote controller, an intercom, a sensor, or a light, portable devices, such as a tablet or a cell phone and the like. The IP devices are connected to sub networks, such as a phone line, a wireless local area network (LAN), Bluetooth, a universal serial bus or a power line. Also, IP devices could be devices that are themselves are not directly on the internet, but the devices that are connected to the internet with the help of IP gateways.

Typically for managing or troubleshooting a device, a user or administrators of the device may send a message to or call up a service center to indicate an erratic behavior of a component of the device before the component fails. Accordingly there is a need for a system and a method to enable remote managing, auditing and troubleshooting of the IP devices to facilitate quick and hassle free troubleshooting of the IP devices.

SUMMARY

In view of the foregoing, an embodiment herein provides a system for managing, auditing and troubleshooting at least one IP device. The system includes a bridge device that relays a connection between an agent device and the at least one IP device to manage, audit and troubleshoot the at least one IP device. The bridge device includes a memory and a processor. The memory stores a set of instructions. The processor executes the set of instructions that including (a) initiating a first secure connection with, or responding to a connection request from an admin device, (b) obtaining information associated with the at least one IP device from the admin device, (c) connecting to a device registry and downloading information associated with the at least one IP device, (d) determining whether a connector to connect with the at least one IP device is installed in the bridge device, (e) communicating a request to the admin device and obtaining, from the admin device, (i) a uniform resource locator (URL) of a connector store, or (ii) a location, from where a connector to connect with the at least one IP device is to be downloaded when the connector to connect with the at least one IP device is not installed in the bridge device, (f) downloading and installing the connector to connect with the at least one IP device as a plug-in module in the bridge device, (g) forming or joining a second secure connection with the agent device to manage, audit and troubleshoot the at least one IP device, (h) forming, on approval from the admin device, a third secure connection, using the connector, between the bridge device and the at least one IP device, (i) securing and relaying information from the second secure connection to the third secure connection when the second secure connection and the third secure connection are connected together and (j) obtaining, using the admin device, the policy filters and one or more input output (IO) masks and providing the policy filters and the one or more IO masks to the connector to manage, audit and troubleshoot the at least one IP device. The information includes the identity of the at least one IP device. The device registry stores the identity and access credentials of the at least one IP device to connect with the at least one IP device. The information is secured end-to-end to prevent tampering. The bridge device restricts session participants other than those using the agent device from accessing the information unless the agent device allows the session participants to interact with the at least one IP device, based on rules enforced by policy filters. The policy filters determine how the session participants interact with the at least one IP device and the one or more IO masks comprise rules that determine what is seen by each of the session participants or what needs to be masked to manage, audit and troubleshoot the at least one IP device.

In an aspect, the one or more non-transitory computer readable storage mediums storing one or more sequences of instructions, which when executed by one or more processors, causes managing, auditing and troubleshooting of at least one IP device, by performing the steps of: (a) obtaining a set of policies from original equipment manufacturer (OEM) policy server, (b) updating the set of policies obtained from the OEM policy server to revoke permissions on at least one of (i) commands or (ii) visibility of information from an agent device, a bridge device or an admin device, (c) storing the updated set of policies in an internal policy server, (d) determining an identity of the at least one IP device from at least one of (i) fault reporting mechanisms or (ii) a request initiated by the agent device, (e) initiating a first secure connection with, or responding to a connection request from the bridge device, (f) determining whether the bridge device comprises a connector to initiate a connection with the at least one IP device, (g) obtaining a request from the bridge device and communicating, to the bridge device, (i) a uniform resource locator (URL) of a connector store or (ii) a location from where a connector to connect with the at least one IP device is to be downloaded when the connector to connect with the at least one IP device is not installed in the bridge device, (h) forming a session or responding to a session creation request made by the agent device to (a) authenticate the agent device and (b) connect the agent device with the bridge device to manage, audit and troubleshoot the at least one IP device when the commands, provided by the agent device, are presented in the set of policies provided by the OEM policy server or the internal policy server and (i) providing information to the bridge device to at least one of (a) connect with the at least one IP device to manage, audit and troubleshoot the at least one IP device, (b) join the session or (c) perform session management operations. The set of policies include at least one of (i) commands to be performed to manage, audit and troubleshoot the at least one IP device or (ii) responses. The admin device is restricted to include additional permissions over the set of policies that are obtained from the OEM policy server. The information associated with the identity of the at least one IP device is communicated to the bridge device.

In another aspect, a computer implemented method for managing, auditing and troubleshooting of at least one IP device is provided. The method includes following steps of: (a) initiating a first secure connection with, or responding to a connection request from an admin device, (b) obtaining information associated with the at least one IP device from the admin device, (c) connecting to a device registry and downloading information associated with the at least one IP device, (d) determining whether a connector to connect with the at least one IP device is installed in the bridge device, (e) communicating a request to the admin device and obtaining, from the admin device, (i) a uniform resource locator (URL) of a connector store, or (ii) a location, from where a connector to connect with the at least one IP device is to be downloaded when the connector to connect with the at least one IP device is not installed in the bridge device, (f) downloading and installing the connector to connect with the at least one IP device as a plug-in module in the bridge device, (g) forming or joining a second secure connection with the agent device to manage, audit and troubleshoot the at least one IP device, (h) forming, on approval from the admin device, a third secure connection, using the connector, between the bridge device and the at least one IP device, (i) securing and relaying information from the second secure connection to the third secure connection when the second secure connection and the third secure connection are connected together and (j) obtaining, using the admin device, the policy filters and one or more input output (IO) masks and providing the policy filters and the one or more IO masks to the connector to manage, audit and troubleshoot the at least one IP device. The information includes an identity of the at least one IP device. The device registry stores the identity and access credentials of the at least one IP device to connect with the at least one IP device. The information is secured end-to-end across second secure connection and third secure connection to prevent tampering. The bridge device restricts session participants other than those using the agent device from accessing the information unless the agent device allows the session participants to interact with the at least one IP device, based on rules enforced by policy filters.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 8 depicts a functional block diagram of an example general-purpose digital computing environment that may be used to implement various aspects of the present technology disclosed herein.

DETAILED DESCRIPTION OF PREFERRED EMBODIMENTS

Figure 1:
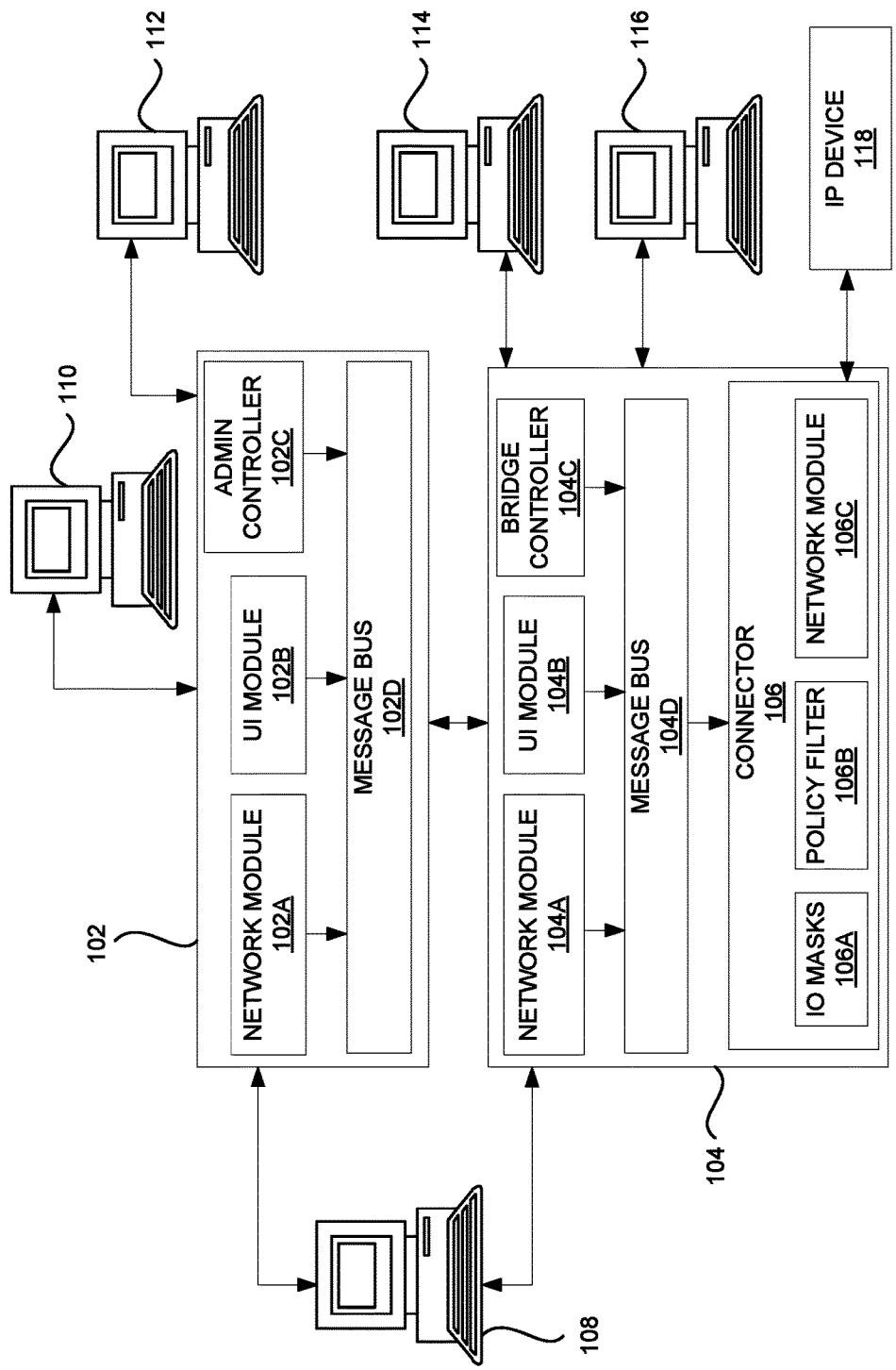
FIG. 1 illustrates an environment view of a system for remotely managing, auditing and troubleshooting an IP device from an agent device according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments of the methods and systems disclosed herein enable managing, auditing and troubleshooting an IP device by facilitating a remote technician to connect securely to the IP device, check one or more configurations of the IP device, issue one or more commands and remotely manage, audit and troubleshoot the IP device, through a sub-channel of an established multimedia session between an agent device and a bridge device of a user of the IP device when an agent initiates and/or receives the session from/to the bridge device through an admin device. In an embodiment the multimedia session may be established using voice over internet (VOIP) protocols. Referring now to the drawings, and more particularly to FIGS. 1 through 8, where similar reference characters denote corresponding features consistently throughout the figures, there are shown preferred embodiments.

FIG. 1 illustrates an environment view of a system for remotely managing, auditing and troubleshooting an IP device 118 from an agent device 108 according to an embodiment herein. In an embodiment, the system includes an admin device 102, a bridge device 104, a connector 106, the agent device 108, an OEM (original equipment manufacturer) policy server 110, a policy server 112 (i.e. an internal policy server), a connector store 114, a device registry 116 and the IP device 118. The system further includes a monitoring, recording and supervising server. The admin device 102 is used by an admin of an enterprise. The admin device 102 includes a network module 102A, a user interface (UI) module 102B, an admin controller 102C and a message bus 102D. The admin device 102 is connected to the agent device 108 using the network module 102A. The user interface (UI) module 102B of the admin device 102 allows an administrator to interact with the admin device 102. The message bus 102D passes information from the admin device 102 to the admin device 102. The admin device 102 may install another connector based on attributes of the admin device 102.

The bridge device 104 includes a network module 104A, a user interface module 104B, a bridge controller 104C and a message bus 104D. The bridge device 104 is connected to the agent device 108 using the network module 104A. The user interface (UI) module 104B of the bridge device 104 allows a user to interact with the bridge device 104. The message bus 104D passes information from the bridge device 104 to the controller 106. In an embodiment, the connector 106 is installed in the bridge device 104. The connector 106 is a plug-in module that is loaded by the bridge device 104. The connector 106 connects the IP device 118 with the bridge device 104 into a session. The connector 106 is a digitally signed and delivered to a request made by the bridge device 104 via secure delivery methods to ensure to tamper proof. The connector 106 includes input output (IO) masks 106A, a policy filter 106B and a network module 106C. The bridge device 104 is connected with the IP device 118 through the connector 106 using the network module 106C. The input output (IO) masks 106A include a set of rules that determine which input and output can be viewed by other session participants (e.g. the admin device 102, the bridge device 104, the agent device 108 or the monitoring, recording and supervising server). The policy filter 106B (e.g. a dynamic policy filter) that includes a set of policies to ensure that commands that can be executed to run.

Initially, the admin device 102 obtains a set of policies from the OEM policy server 110 in offline mode, not during the session. The set of policies include at least one of (a) commands to be performed to manage, audit and troubleshoot the IP device 118 or (b) responses. The admin device 102 may further update the set of policies obtained from the OEM policy server 110 to revoke permissions on at least one of (a) the commands or (b) the visibility of information from the agent device 108, the bridge device 104 or the admin device 102. In an embodiment, the admin device 102 is restricted to include additional permissions over the set of policies that are obtained from the OEM policy server 110. The admin device 102 stores the set of policies in the policy server 112 (i.e. an internal policy server). The set of policies include commands to execute on or responses from the IP device 118 based on the session participants and a current state of a decision tree. In an embodiment, the entire decision tree is not necessary to be downloaded at the same time. The relevant decisions in the decision tree may be downloaded with more downloads on need. In an embodiment, the admin device 102 determines an identity of the IP device 118 from at least one of (a) fault reporting mechanisms or (b) a request initiated by the agent device 108.

Further, the admin device 102 initiates a first secure connection with the bridge device 104. In an embodiment, the admin device 102 initiates the first secure connection by responding to a connection request from the bridge device 104. In an embodiment, information associated with the identity of the IP device 118 is communicated to the bridge device 104. The admin device 102 determines whether the bridge device 104 includes the connector 106 to initiate a connection with the IP device 118. The admin device 102 communicates, on obtaining a request from the bridge device 104, (a) a uniform resource locator (URL) of the connector store 114 or (b) a location from where the connector 106 to connect with the IP device 118 is to be downloaded when the connector 106 to connect with the IP device 118 is not installed in the bridge device 104. The admin device 102 forms a session or responds to a session creation request made by the agent device 108 to (a) authenticate the agent device 108 and (b) connect the agent device 108 with the bridge device 104 to manage, audit and troubleshoot the IP device 118 when the commands, provided by the agent device 108, are presented in the set of policies provided by the OEM policy server 110 or the policy server 112 (i.e. the internal policy server). The admin device 102 provides information to the bridge device 104 to at least one of (a) connect with the IP device 118 to manage, audit and troubleshoot the IP device 118, (b) join the session or (c) perform session management operations. In an embodiment, the admin controller 102C of the admin device 102 performs the operations as described above.

The bridge device 104 initiates a first secure connection with, or responds to a connection request from the admin device 102. In one embodiment, the first secure connection may be a session-oriented connection (i.e. a secure socket session, based on known protocols like SSH, HTTPS, RDC, VNC or any other proprietary IP based protocol over TCP, UDP or SCTP). The bridge device 104 obtains the information associated with the IP device 118 from the admin device 102. In an embodiment, the information includes an identity of the IP device 118. The bridge device 104 connects to the device registry 116 and downloads the information associated with the IP device 118. In an embodiment, the device registry 116 stores the identity and access credentials of the IP device 118. In another embodiment, the bridge device 104 determines whether the connector 106 to connect with the IP device 118 is installed in the bridge device 104 itself. The bridge device 104 communicates a request to the admin device 102 and obtains, from the admin device 102, (a) a uniform resource locator (URL) of the connector store 114, or (b) a location, from where the connector 106 to connect with the IP device 118 is to be downloaded when the connector 106 to connect with the IP device 118 is not installed in the bridge device 104. In an embodiment, the connector 106 is obtained from the connector store 114. The bridge device 104 downloads the connector 106 from the connector store 114 and installs the connector 106 to connect with the IP device 118 as a plug-in module in the bridge device 104.

Further, the bridge device 104 forms/joins the second secure connection with the agent device 108 to manage, audit and troubleshoot the IP device 118. In an embodiment, the management of the IP device 118 includes at least one of (a) determining operating status of the IP device 118, checking logs, running commands, reading/writing configuration, operating the IP device 118, troubleshooting the IP device 118, auditing the IP device 118 or any actions that are performed by an administrator on the IP device 118. The bridge device 104 forms/joins the third secure connection, using the connector 106, between the bridge device 104 and the IP device 118 when the admin device 102 approves. In an embodiment, the third secure connection is a slave of the second secure connection. The third secure connection may be broken when the second secure connection is broken for any reasons. In an embodiment, the third secure connection may be a session-less connection (e.g. the third secure connection operates like REST interface to the IP device 118 where the bridge device 104 logs in to the IP device 118 and may use a secure token to communicate with the IP device 118). In another embodiment, the bridge device 104 automatically re-initiates the third secure connection when the second secure connection is up and the third secure connection is down. The bridge device 104 notifies the admin device 102 and the agent device 108 and performs further actions to re-initiate/form the third secure connection based on at least one of (a) instructions received from the admin device 102 or (b) a request received from the agent device 108. In yet another embodiment, the bridge device 104 performs a pre-approved list of tasks for managing the IP device 118 when the admin device 102 drops the first secure connection. In an embodiment, the bridge device 104 can (a) act as a hub by connecting to all the IP devices 118 at a time in parallel, (b) act as a hub by connecting to one IP device 118 at a time and switch to another IP device when required, and/or (c) use the session-less method and send REST-like commands to any number of the IP devices 118 at a time.

The bridge device 104 secures and relays information from the second secure connection to the third secure connection when the second secure connection and the third secure connection are connected. In an embodiment, the information includes at least one of (a) commands or (b) responses obtained from the IP device 118. In another embodiment, the information is secured to end-to-end to prevent tampering using known security and encryption mechanisms like public key information (PKI), symmetric session keys etc. In an embodiment, unencrypted information is transferred between a sender and receiver of the session and secured with a hash that is encrypted and signed by the sender. The receiver (a) decodes the hash, (b) validates whether the hash is received from the sender, (c) received the information, (d) computes the hash and (e) verifies the information with the decoded hash before processing the information. In an embodiment, the bridge device 104 restricts other session participants (e.g. the admin device 102, the monitoring, recording and supervising server and the policy server 112) other than those using the agent device 108 from accessing the information unless the agent device 108 allows the session participants to interact with the IP device 118, based on rules enforced by policy filters. The bridge device 104 further obtains the policy filters and one or more IO masks by using the admin device 102. The bridge device 104 provides the policy filters and the one or more IO masks to the connector 106 to manage, audit and troubleshoot the IP device 118. In an embodiment, the set of policies and one or more IO masks are digitally signed and delivered to a request made by the bridge device 104 via secure delivery methods to ensure to tamper-proofing. In an embodiment, the policy filters determine how the session participants interact with the IP device 118. The policy filters include the decision tree. The decision tree may be stateless or depends on at least one of (a) state of the IP device 118 or (b) an outcome of an earlier command. In an embodiment, the interaction with the IP device 118 includes at least one of the commands or requests that are communicated by the session participants. In an embodiment, the bridge controller 104C of the bridge device 104 performs the operations as has been described above.

The one or more IO masks include rules that determine what is seen by each of the session participants or what needs to be masked to manage, audit and troubleshoot the IP device 118. The one or more IO masks control visibility of the information from the session participants. In an embodiment, the one or more IO masks determine what commands or requests are visible to the admin device 102, the bridge device 104, or the monitoring, recording and supervising server when the information is transferred from the agent device 108 to the IP device 118. In another embodiment, the one or more IO masks further determine what the information is visible to the agent device 108, the bridge device 104, the admin device 102 or the monitoring, recording and supervising server when the information is returned from the IP device 118 to the agent device 108. The monitoring, recording and supervising server listens into the session and records the session unless the agent device 108 approves an additional interaction with the IP device 118. The monitoring, recording and supervising server could be used by an external consultant, a trainee agent, and/or the supervisor. The monitoring, recording and supervising server may join the conference as a silent observer (i.e. stealth mode) or in a visible mode. The recording and logging of the session may be done in a centralised fashion or at the individual devices (such as the admin device 102, the agent device 108, the bridge device 104, and the like) and later, using a session-id, collated via out-of-band means to a central logging server.

The admin device 102, the bridge device 104 and the agent device 108 may be connected through a communication network, such as a local area network, a wide area network, a mobile communication network and the like. The bridge device 104, and the IP device 118 are connected in an enterprise network/a home network or a VPN (Virtual Private Network). Examples of the admin device 102, bridge device 104 and/or the agent device 108 may include, but is not limited to, a mobile communication device, a laptop, a desktop, a tablet, and any other type of mobile computing device.

The IP device 118 may include any device that is capable of connecting to an IP network and may be protected through a firewall. The session (e.g. HTTP, VoIP session, chat or any socket communication between the second secure connection and the third secure connection) may be established between the agent device 108 and the bridge device 104 using any other communication protocol like tunneling protocol, VoIP protocols etc. The session may be a multimedia session (such as an IP session or VOIP session) that could enable at least one of an audio session, video session, audio/video chat, screen sharing, co-browsing and the like. In an embodiment, the session may be a peer to peer session or a session that may be established through a conference server.

The bridge device 104 may also use VOIP protocols and the tunneling protocols to go across firewalls and/or NAT (network address translation) of the IP device 118. The admin device 102 invites the bridge device 104 via in-session signaling through the VoIP protocols (i.e. a message on a message queue/IPC or function call, email, sms, calendar invite, a different phone, etc.). In an embodiment, the bridge device 104 could be in a network different from that the IP device 118, and the bridge device 104 may be connected to the IP device 118 in one of two ways including (a) by creating a VPN (Virtual Private Network) to the IP network of the IP device 118 and joining a conference server from the network, where the VPN connection to the network may be auto-initiated in response to a 'request' to connect to the IP device 118 (on knowing that the bridge device 104 is in a remote network) or manually and (b) the bridge device 104 may reach out to the public IP network of the IP device 118, if the IP device 118 is open to public internet.

Figure 2:
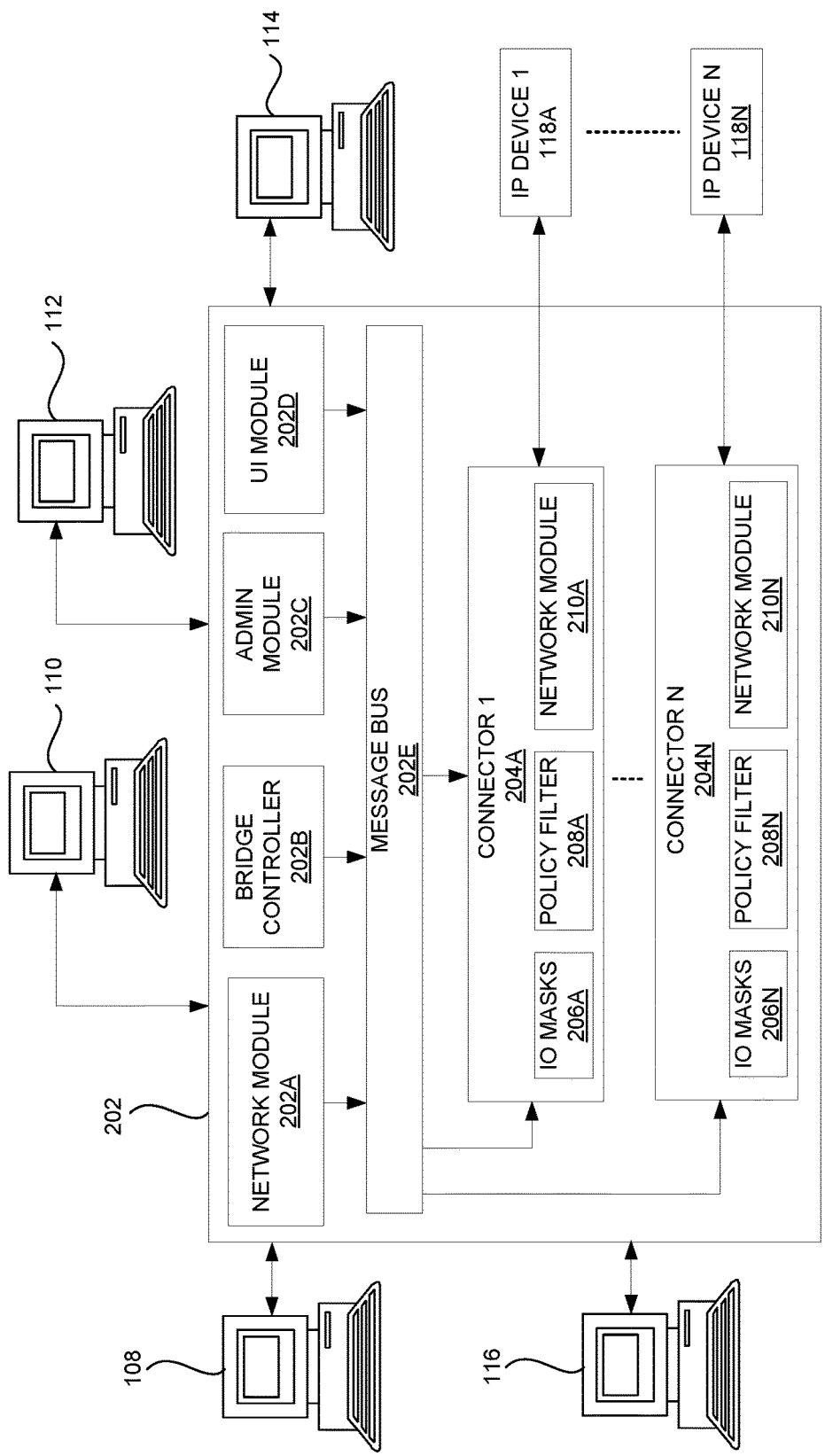
FIG. 2 illustrates an environment view of a system for remotely managing, auditing and troubleshooting one or more IP devices with a combined bridge and admin device of FIG. 1 according to an embodiment herein.

FIG. 2 illustrates an environment view of a system for remotely managing, auditing and troubleshooting one or more IP devices 118A-N with a combined bridge and admin device 202 of FIG. 1 according to an embodiment herein. The combined bridge and admin device 202 includes a network module 202A, a bridge controller 202B, an admin module 202C, a UI module 202D and a message bus 202E. The combined bridge and admin device 202 further includes one or more connectors 204A-N. The one or more connectors 202A-N include one or more input output (IO) masks 206A-N, one or more policy filters 208A-N and one or more network modules 210A-N. In an embodiment, the one or more connectors 204A-N may be connected with the combined bridge and admin device 202 separately. The combined bridge and admin device 202 is connected with the agent device 108 using the network module 202A. The user interface (UI) module 202D of the combined bridge and admin device 202 may interface with a user of the combined bridge and admin device 202. The message bus 202E passes information from the combined and bridge admin device 202 to the one or more connectors 204A-N. The combined bridge and admin device 202 may include both the bridge controller 202B and the admin module 202C and performs the operations of the bridge controller 202B and the admin module 202C as has been described above. Also, the operations of the one or more input output (IO) masks 206A-N, one or more policy filters 208A-N and one or more network modules 210A-N as has been described above.

Figure 3:
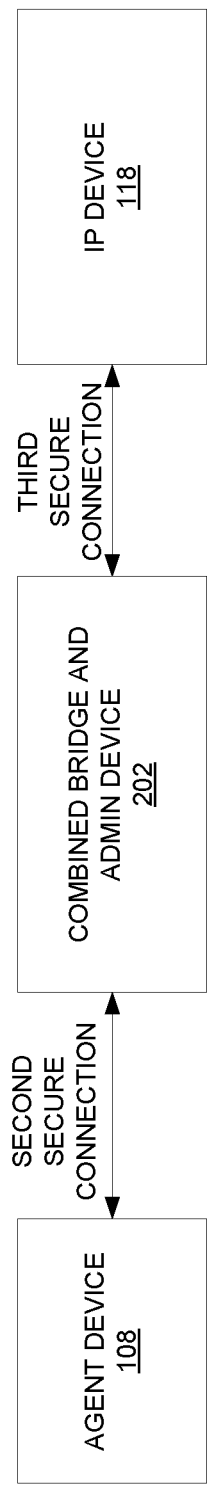
FIG. 3 illustrates a block diagram of the system for remotely managing, auditing and troubleshooting the IP device using the combined bridge and admin device through a second secure connection and a third secure connection of FIG. 2 according to an embodiment herein.

FIG. 3 illustrates a block diagram of the system for remotely managing, auditing and troubleshooting an IP device 118 using the combined bridge and admin device 202 through a second secure connection and a third secure connection of FIG. 2 according to an embodiment herein. The block diagram includes the agent device 108, the combined bridge and admin device 202 and an IP device 118. The combined bridge and admin device 202 that combines roles of both the admin device 102 and the bridge device 104, forms/joins the second secure connection with the agent device 108 to manage, audit and troubleshoot the IP device 118 as has been described above. Also, the combined bridge and admin device 202 forms the third secure connection with the IP device 118 using the one or more connectors 204A-N. In an embodiment, the admin device 102 may itself serve the functionality of the bridge device 104. The role of the admin device 102 and/or the bridge device 104 may be bundled in a single application, a web page, and one or more scripts in the combined bridge and admin device 202.

Figure 4:
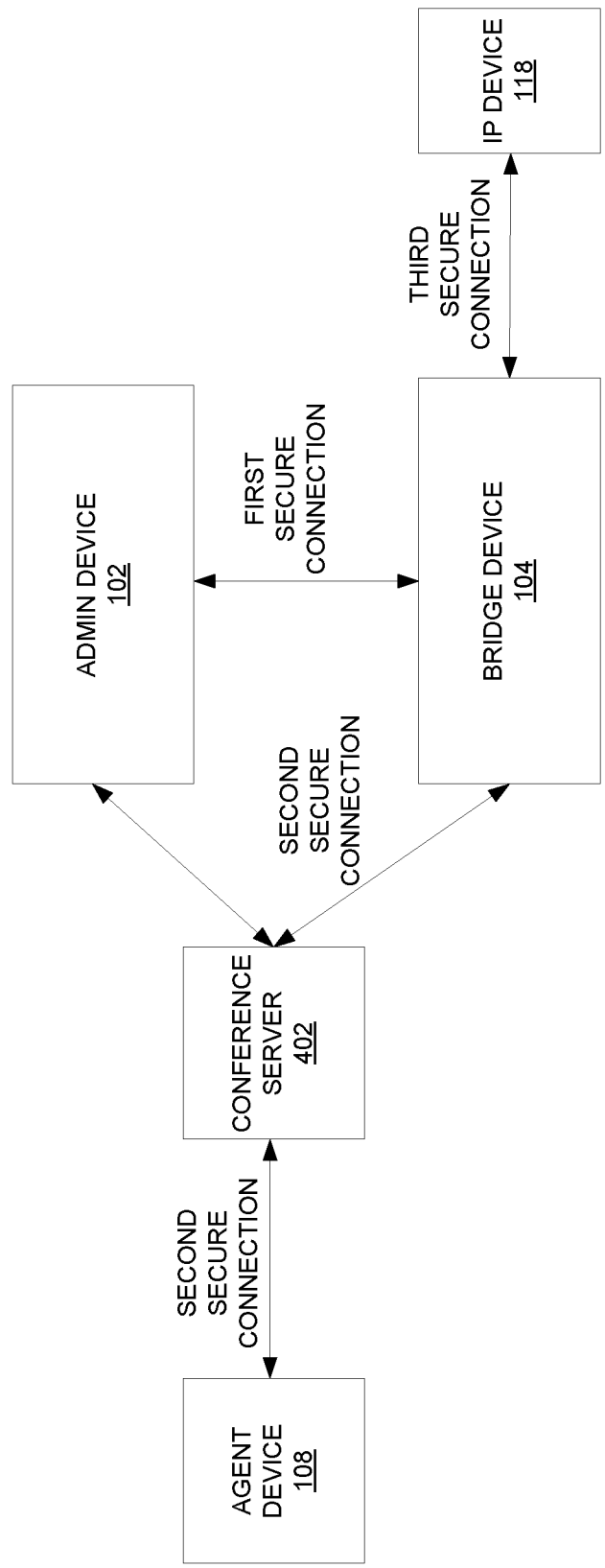
FIG. 4 is a block diagram of the system for remotely managing, auditing and troubleshooting the IP device using a conference server through the second secure connection and the third secure connection of FIG. 1 according to an embodiment herein.

FIG. 4 is a block diagram of the system for remotely managing, auditing and troubleshooting the IP device 118 using a conference server 402 through the second secure connection and the third secure connection of FIG. 1 according to an embodiment herein. The block diagram includes the conference server 402, the IP device 118, the admin device 102, the bridge device 104 and the agent device 108. The conference server 402 permits or blocks at least one of the agent device 108 or the admin device 102 from being a part of the session. The conference server 402 may be a single focus (such as, with both media and signaling) or multi focus (such as with a signaling server different from media server, with a media server cascaded, and the like.). The conference server 402 may be operating in a switched mode or a mixed mode (by mixing all media streams or switching streams). An access to the IP device 118 from the agent device 108 is routed through the bridge device 104 via the conference server 402. The bridge device 104 may be connected with the conference server 402 to receive information from the agent device 108 using the second secure connection. The bridge device 104 may be connected to the IP device 118 using the third secure connection and relays the information between the second secure connection and third secure connection when the second secure connection and third secure connection are connected. In an embodiment, the conference server 402 may be connected to the bridge device 104 via the admin device 102.

Figure 5:
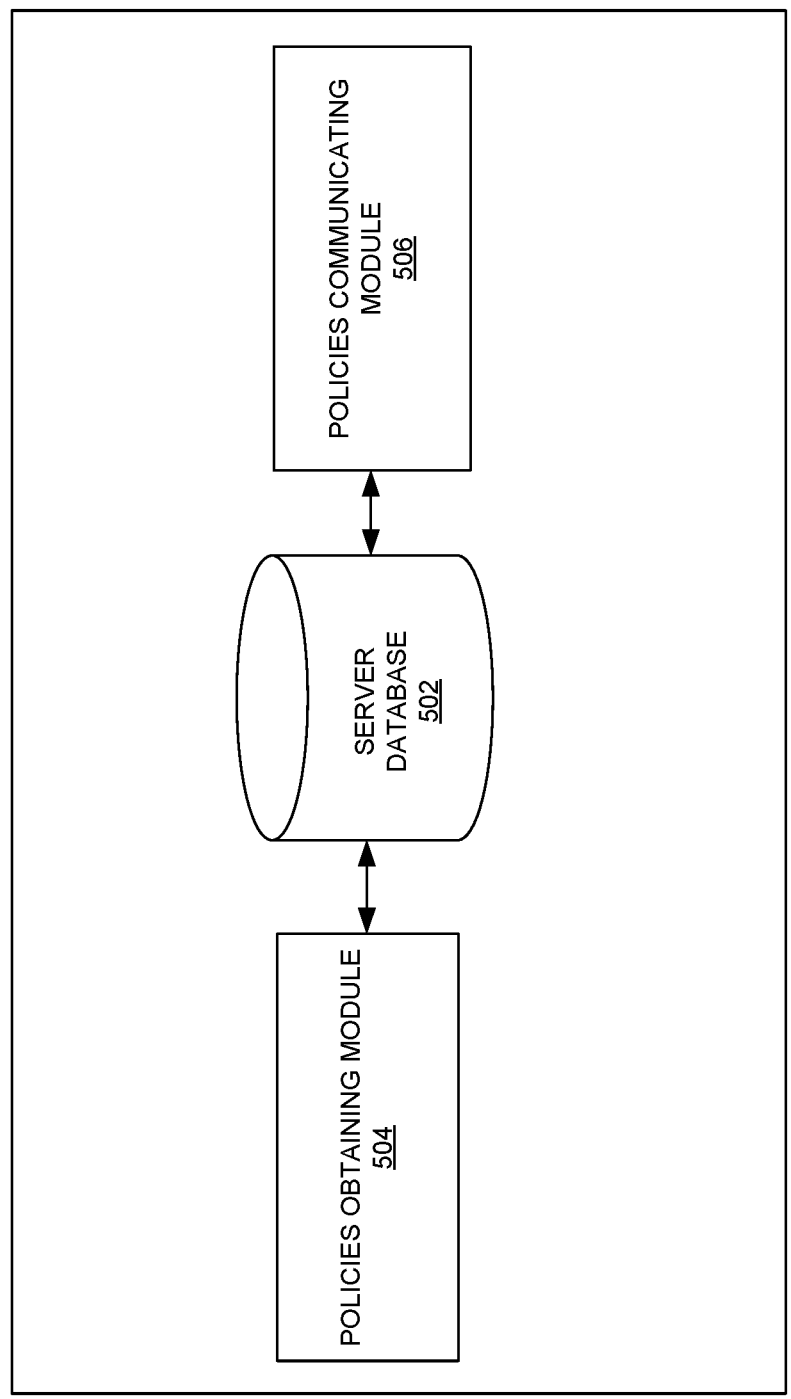
FIG. 5 illustrates an exploded view of a policy server (i.e. an internal policy server) of FIG. 1 according to an embodiment herein.

FIG. 5 illustrates an exploded view of the policy server 112 of FIG. 1 according to an embodiment herein. The exploded view includes a server database 502, a policy obtaining module 504 and a policy communicating module 506. The server database 502 store the set of policies that include at least one of (a) commands to be performed to manage, audit and troubleshoot the IP device 118 or (b) responses from at least one of (a) the admin device 102 or the bridge device 104. The policy obtaining module 504 obtains the set of policies that are updated from the admin device 102. The policy communicating module 506 communicates the updated set of policies to the bridge device 104 when the bridge device 104 receives information to obtain the policy filters and the one or more IO masks from the policy server 112 to manage, audit and troubleshoot the IP device 118. In an embodiment, the bridge device 104 receives information to obtain the policy filters and the one or more IO masks from the OEM policy server 110.

Figure 6A:
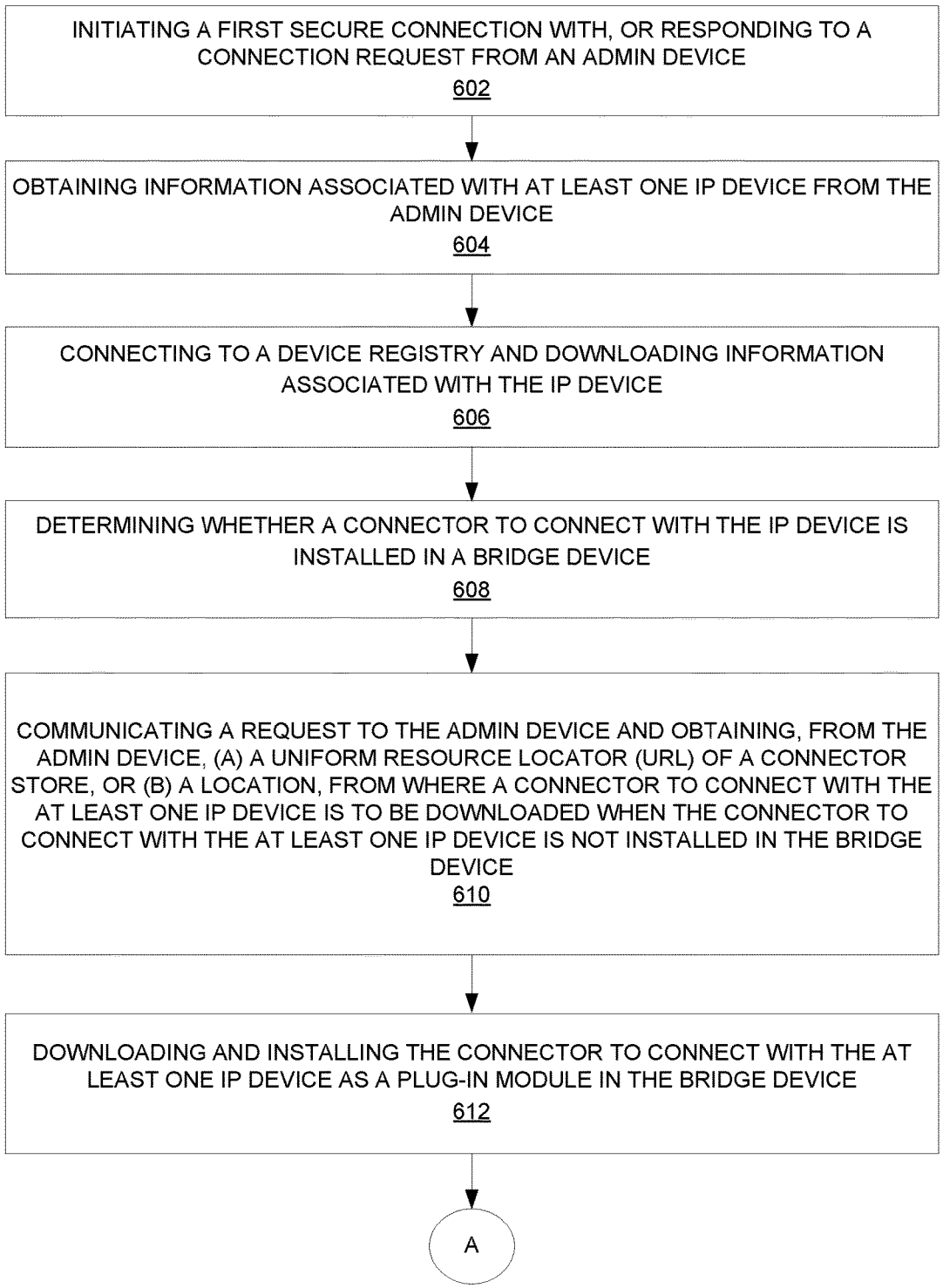
FIGS. 6A-6B are flow diagrams that illustrate a method of managing, auditing and troubleshooting of IP device using a bridge device according to an embodiment herein.
Figure 6B:
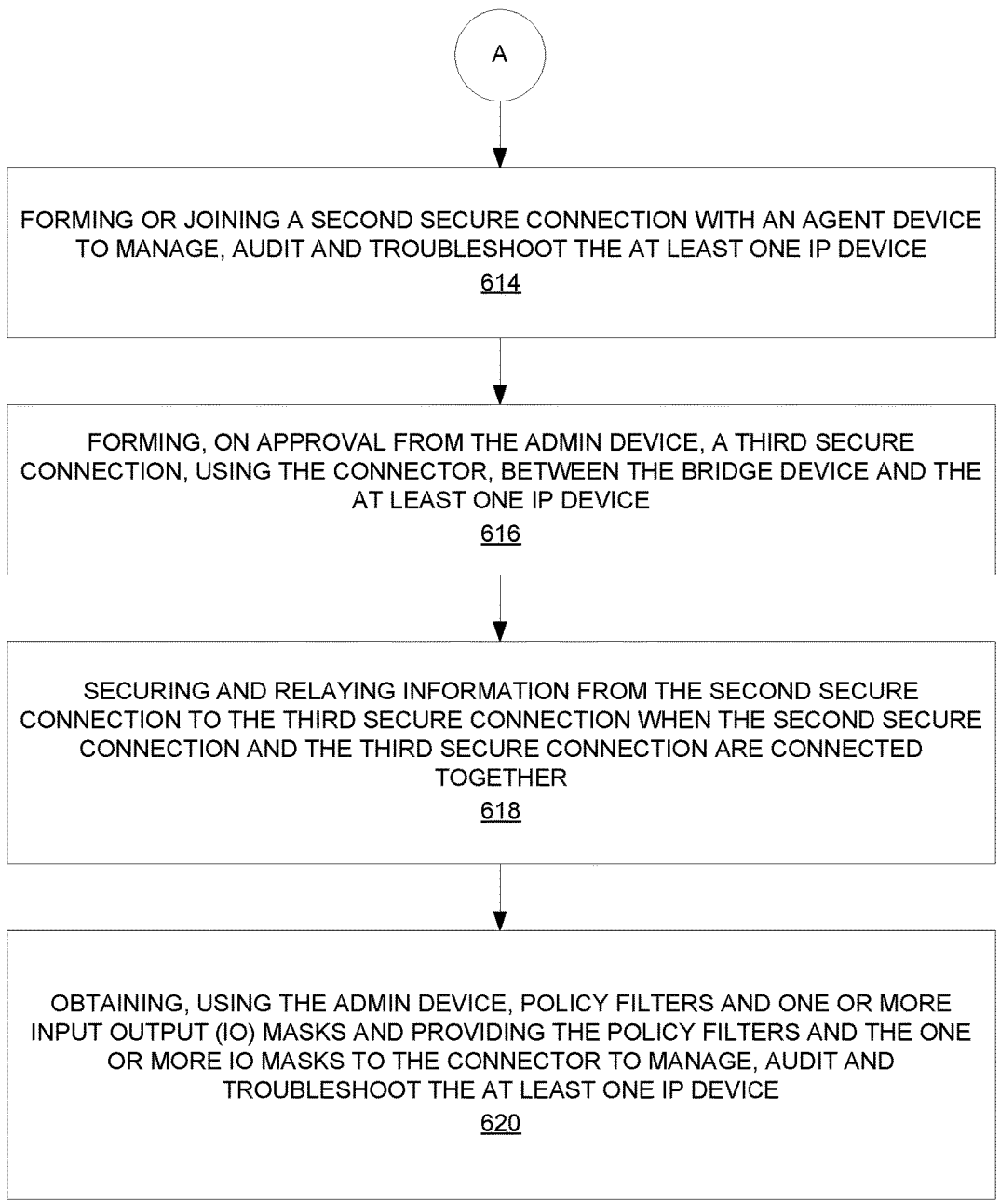

FIGS. 6A-6B are flow diagrams that illustrate a method of managing, auditing and troubleshooting of an IP device 118 by using a bridge device 104 according to an embodiment herein. At step 602, a first secure connection with, or a response to a connection request from an admin device 102 is initiated. At step 604, information associated with the IP device 118 is obtained from the admin device 102. The information includes the identity of the IP device 118. At step 606, the bridge device 104 is connected to a device registry 116 and the information associated with the IP device 118 is downloaded. At step 608, the bridge device 104 determines whether a connector 106 to connect with the IP device 118 is installed in the bridge device 104. At step 610, a request is communicated to the admin device 102 and (a) a uniform resource locator (URL) of a connector store 114, or (b) a location, from where the connector 106 to connect with the IP device 118 is to be downloaded, is obtained when the connector 106 to connect with the IP device 118 is not installed in the bridge device 104. At step 612, the connector 106 to connect with the IP device 118 is downloaded and installed as a plug-in module in the bridge device 104. At step 614, a second secure connection is formed or joined with the agent device 108 to manage, audit and troubleshoot the IP device 118. At step 616, a third secure connection is formed between the bridge device 104 and the IP device 118 on approval from the admin device 102. At step 618, information passed between the second secure connection and the third secure connection is secured and relayed when the second secure connection and the third secure connection are connected together. In an embodiment, the information is secured end-to-end to prevent tampering. At step 620, the policy filters and one or more input output (IO) masks are obtained and provided to the connector 106 to manage, audit and troubleshoot the IP device 118. In an embodiment, the policy filters determine how the session participants interact with the IP device 118. The one or more IO masks comprise rules that determine what is seen by each of the session participants or what needs to be masked to manage, audit and troubleshoot the IP device 118. In an embodiment, session participants (e.g. the admin device 102 and the bridge device 104) other than those using the agent device 108 are restricted from accessing the information unless the agent device 108 allows the session participants to interact with the IP device 118, based on rules enforced by policy filters.

Figure 7A:
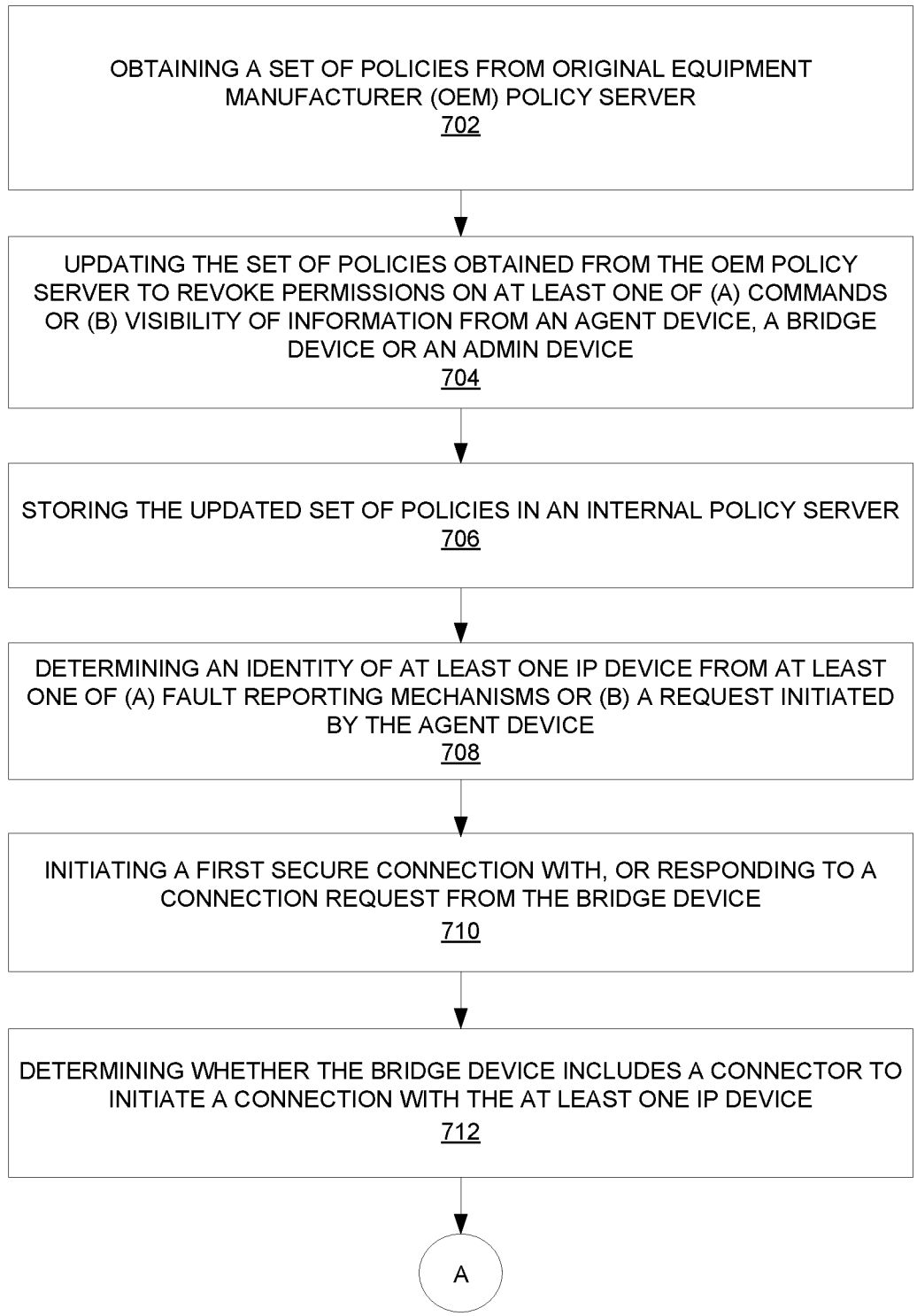
FIGS. 7A-7B are flow diagrams that illustrate a method of managing, auditing and troubleshooting of IP device using an admin device according to an embodiment herein.
Figure 7B:
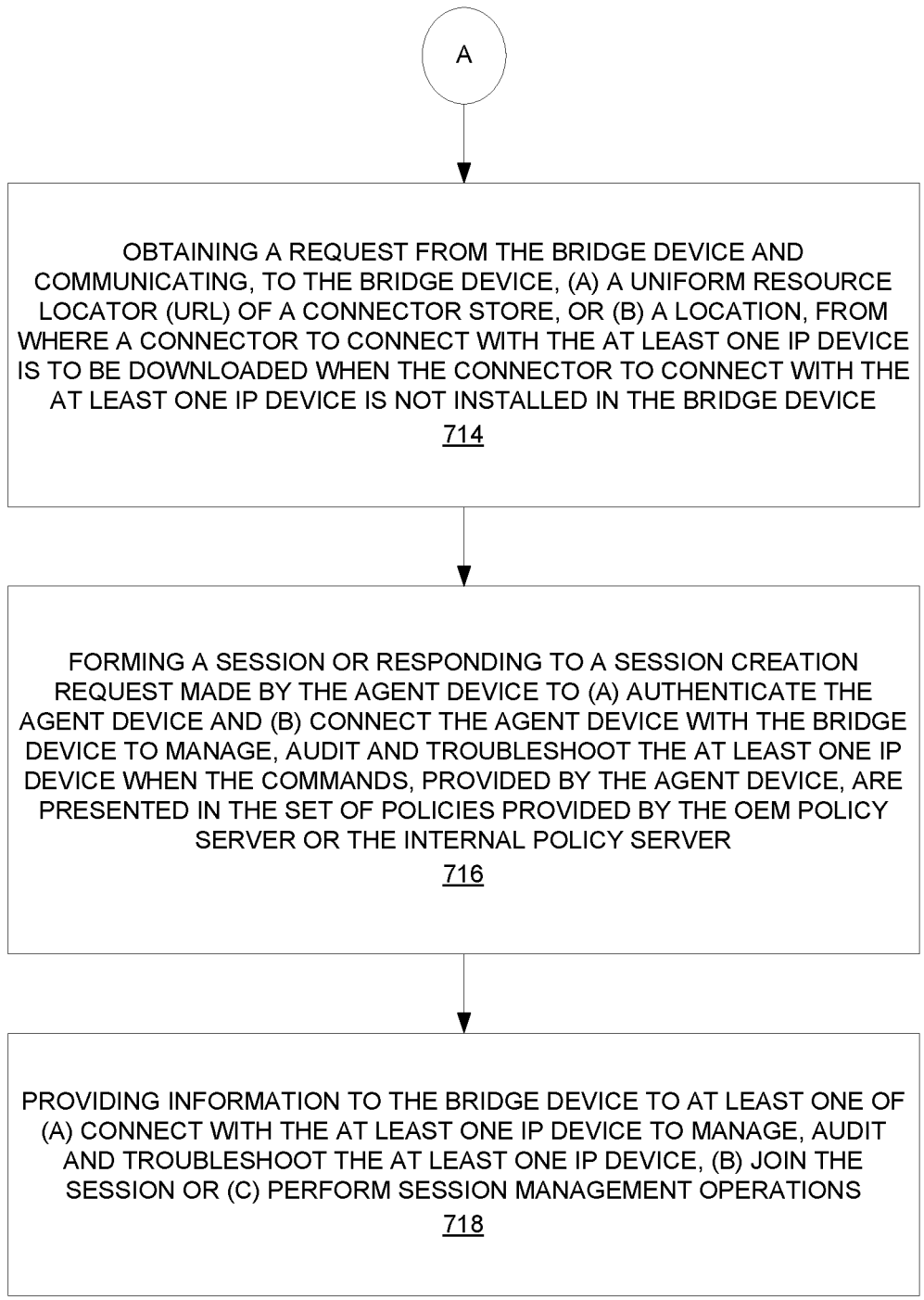

FIGS. 7A-7B are flow diagrams that illustrate a method of managing, auditing and troubleshooting of IP device 118 by using an admin device 102 according to an embodiment herein. At step 702, a set of policies are obtained from an original equipment manufacturer (OEM) policy server 110. The set of policies include at least one of (a) commands to be performed to manage, audit and troubleshoot the IP device 118 or (b) responses. At step 704, the set of policies obtained from the OEM policy server 110 is updated to revoke permissions on at least one of (a) the commands or (b) visibility of the information from an agent device 108, a bridge device 104 or an admin device 102. In an embodiment, the admin device 102 is restricted to include additional permissions over the set of policies that are obtained from the OEM policy server 110. At step 706, the updated set of policies is stored in a policy server 112 (e.g. an internal policy server). At step 708, an identity of the IP device 118 is determined from at least one of (a) fault reporting mechanisms or (b) a request initiated by the agent device 108. At step 710, a first secure connection with, or a response to a connection request from the bridge device 104 is initiated. In an embodiment, information associated with the identity of the IP device 118 is communicated to the bridge device 104. At step 712, the admin device 102 determines whether the bridge device 104 comprises a connector 106 to initiate a connection with the IP device 118. At step 714, a request is obtained from the bridge device 104 and (a) a uniform resource locator (URL) of a connector store 114 or (b) a location from where a connector 106 to connect with the at least one IP device 118 is to be downloaded, is communicated to the bridge device 104 when the connector 106 to connect with the IP device 118 is not installed in the bridge device 104. At step 716, a session or response to a session creation request made by the agent device 108 is formed to (a) authenticate the agent device 108 and (b) connect the agent device 108 with the bridge device 104 to manage, audit and troubleshoot the IP device 118 when the commands, provided by the agent device 108, are presented in the set of policies provided by the OEM policy server 110 or the internal policy server (e.g. the policy server 112). At step 718, information is provided to the bridge device 104 to at least one of (a) connect with the IP device 118 to manage, audit and troubleshoot IP device 118, (b) join the session or (c) perform session management operations.

FIG. 8 depicts a functional block diagram of an example general-purpose digital computing environment that may be used to implement various aspects of the present technology disclosed herein (such as for example, an admin device 102, a bridge device 104, an agent device 108). The general purpose digital computing environment of FIG. 8 includes a processor 802, a main memory 804, a static memory 806, a bus 808, a video display 810, an alpha-numeric input device 812, a cursor control device 814, a drive unit 816, a signal generation device 818, a network interface device 820, a machine readable medium 822, instructions 824 and a network 826, according to one embodiment.

The processor 802 may be include, but is not limited to a microprocessor, a state machine, an application specific integrated circuit, a field programmable gate array, etc. (e.g., an Intel® Pentium® processor). The main memory 804 may be a dynamic random access memory and/or a primary memory of a computer system. The static memory 806 may include for example a hard disk drive for reading from and writing to a hard disk (not shown), a magnetic disk drive for reading from or writing to a removable magnetic disk, or an optical disk drive for reading from or writing to a removable optical disk such as a CD ROM or other optical media. The drives and their associated computer-readable media provide nonvolatile storage of computer readable instructions, data structures, program modules and other data for a computer. It will be appreciated by those skilled in the art that other types of computer readable media that can store data that is accessible by a computer, such as magnetic cassettes, flash memory cards, digital video disks, Bernoulli cartridges, RAMs, ROMs, and the like, may also be used in the example general purpose computing environment.

The bus 808 may be an interconnection between various circuits and/or structures of the purpose computing environment. The video display 810 may provide a graphical representation of information on the data processing system. The alpha-numeric input device 812 may be a keypad, a keyboard and/or any other input device of text (e.g., a special device to aid the physically handicapped), a microphone, joystick, game pad, satellite dish, scanner or the like. The alpha-numeric input device 812 is often connected to the processing unit through a serial port interface that is coupled to the system bus, but may be connected by other interfaces, such as a parallel port, game port or a universal serial bus (USB).

The cursor control device 814 may be a pointing device such as a mouse. The drive unit 816 may be the hard drive, a storage system, and/or other longer term storage subsystem. The signal generation device 818 may be a bios and/or a functional operating system of the data processing system. The network interface device 820 may be a device that performs interface functions such as code conversion, protocol conversion and/or buffering required for communication to and from the network 826. The machine readable medium 822 may provide instructions on which any of the methods disclosed herein may be performed. The instructions 824 may provide source code and/or data code to the processor 802 to enable any one or more operations disclosed herein.

The embodiments herein can take the form of, an entirely hardware embodiment, an entirely software embodiment, or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, a semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The system and the method for managing, auditing and troubleshooting the IP device 118 (i.e. the IP connected devices) disclosed herein enables management, auditing, and troubleshooting via an established session. The connector 106 is used to connect the bridge device 104 with the IP device 118. The system is used for agents to easily reach into the user's network and debug any network-enabled device. A normal mobile phone or a tablet may be used as a connection pipe for troubleshooting the problems. Establishing the management, auditing, and troubleshooting session is as simple as making a normal video call. The system and method disclosed herein enable relaying ability of bridge device 104 that ensures that agent is never directly connected into the 'target network'. This ensures IP/network opacity towards the agent. Also, the fact that agent is not exposed to a SSH/HTTPS connection to the target network greatly reduces chances of hacking or meandering (where agent can connect to a bridge device 104 and from there, tunnel out to other IP device 118). The system enables establishing a secure tunnel for management, auditing, and troubleshooting while hiding network topology details of the host network from the agent device 108, being able to provide a level of access control at the IP device 118 and the ability to securely monitor and record the interaction between the agent device 108 and the IP device 118.

The foregoing description of the specific embodiments will so fully reveal the general nature of the embodiments herein that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for managing, auditing and troubleshooting at least one IP device, said system comprising:
    a bridge device that relays a connection between an agent device and said at least one IP device to manage, audit and troubleshoot said at least one IP device, wherein said bridge device comprises:
        a memory that stores a set of instructions; and
        a processor that executes said set of instructions, said set of instructions comprising:
            initiating a first secure connection with, or responding to a connection request from an admin device;
            obtaining information associated with said at least one IP device from said admin device, wherein said information comprises an identity of said at least one IP device;
            connecting to a device registry and downloading information associated with said at least one IP device, wherein said device registry stores said identity and access credentials of said at least one IP device to connect with said at least one IP device;
            determining whether a connector to connect with said at least one IP device is installed in said bridge device;
            communicating a request to said admin device and obtaining, from said admin device, (a) a uniform resource locator (URL) of a connector store, or (b) a location, from where a connector to connect with said at least one IP device is to be downloaded when said connector to connect with said at least one IP device is not installed in said bridge device;
            downloading and installing said connector to connect with said at least one IP device as a plug-in module in said bridge device;
            forming or joining a second secure connection with said agent device (108) to manage, audit and troubleshoot said at least one IP device;
            forming, on approval from said admin device, a third secure connection, using said connector, between said bridge device and said at least one IP device;
            securing and relaying information from said second secure connection to said third secure connection when said second secure connection and said third secure connection are connected together, wherein said information is secured end-to-end to prevent tampering, wherein said bridge device restricts session participants other than those using said agent device from accessing said information unless said agent device allows said session participants to interact with said at least one IP device, based on rules enforced by policy filters; and
            obtaining, using said admin device, said policy filters and one or more input output (IO) masks and providing said policy filters and said one or more IO masks to said connector to manage, audit and troubleshoot said at least one IP device, wherein said policy filters determine how said session participants interact with said at least one IP device and said one or more IO masks comprise rules that determine what is seen by said each of session participants or what needs to be masked to manage, audit and troubleshoot said at least one IP device.

2. The system of claim 1, further comprising a policy server that provides said set of policies, wherein said set of policies comprise commands to execute on or responses from said at least one IP device based on said session participants and a current state of a decision tree.

3. The system of claim 2, wherein said policy filters comprise said decision tree, wherein said decision tree determines how said session participants interact with said at least one IP device, wherein an interaction with said at least one IP device comprises at least one of said commands or requests that are communicated by said session participants.

4. The system of claim 3, wherein said decision tree is stateless or depends on at least one of (a) state of said at least one IP device or (b) an outcome of an earlier command.

5. The system of claim 1, wherein said one or more IO masks control visibility of said information from said session participants, wherein said one or more IO masks determine what commands or requests are visible in said admin device, said bridge device, or a monitoring, recording and supervising server when said information is transferred from said agent device to said at least one IP device, wherein said one or more IO masks determine what said information is visible in said agent device, said bridge device, said admin device or said monitoring, recording and supervising server when said information is returned from said at least one IP device to said agent device.

6. The system of claim 1, further comprising a conference server that permits or blocks one or more devices from being a part of a session, wherein said one or more devices comprise at least one of said agent device or said admin device.

7. The system of claim 1, further comprising said monitoring, recording and supervising server that listens into said session and records said session unless said agent device approves an additional interaction with said at least one IP device.

8. The system of claim 1, further comprising an original equipment manufacturer (OEM) policy server that provides said set of policies from an original equipment manufacturer (OEM) to said admin device, wherein said set of policies are updated and stored in said policy server to manage, audit and troubleshoot said at least one IP device.

9. The system of claim 1, wherein unencrypted information is transferred between a sender and a receiver of said session and secured with a hash that is encrypted, and signed by said sender, wherein said receiver (a) decodes said hash, (b) validates whether said hash is received from said sender, (c) receives said information, (d) computes said hash and (e) verifies said information with said decoded hash before processing said information.

10. The system of claim 1, wherein said set of instructions executed by said processor further comprises breaking said third secure connection when said second secure connection is broken down for any reason, wherein said third secure connection is a slave of said second secure connection.

11. The system of claim 1, wherein said set of instructions executed by said processor further comprises automatically re-initiating said third secure connection when said second secure connection is up and said third secure connection is down, wherein said processor notifies said admin device and said agent device, and performs further actions to re-initiate said third secure connection based on at least one of (a) instructions received from said admin device or (b) a request received from said agent device.

12. The system of claim 1, wherein said set of instructions executed by said processor further comprises performing a pre-approved list of tasks for managing said at least one IP device when said admin device drops said first secure connection.

13. One or more non-transitory computer readable storage mediums storing one or more sequences of instructions, which when executed by one or more processors, causes managing, auditing and troubleshooting of at least one IP device, by performing the steps of:

obtaining a set of policies from original equipment manufacturer (OEM) policy server, wherein said set of policies comprise at least one of (a) commands to be performed to manage, audit and troubleshoot said at least one IP device or (b) responses;

updating said set of policies obtained from said OEM policy server to revoke permissions on at least one of (a) said commands or (b) said visibility of information from an agent device, a bridge device or an admin device, wherein said admin device is restricted to include additional permissions over said set of policies that are obtained from said OEM policy server;

storing said updated set of policies in an internal policy server;

determining an identity of said at least one IP device from at least one of (a) fault reporting mechanisms or (b) a request initiated by said agent device;

initiating a first secure connection with, or responding to a connection request from said bridge device, wherein information associated with said identity of said at least one IP device is communicated to said bridge device;

determining whether said bridge device comprises a connector to initiate a connection with said at least one IP device;

obtaining a request from said bridge device and communicating, to said bridge device, (a) a uniform resource locator (URL) of a connector store or (b) a location from where a connector to connect with said at least one IP device is to be downloaded when said connector to connect with said at least one IP device is not installed in said bridge device;

forming a session or responding to a session creation request made by said agent device to (a) authenticate said agent device and (b) connect said agent device with said bridge device to manage, audit and troubleshoot said at least one IP device when said commands, provided by said agent device, are presented in said set of policies provided by said OEM policy server or said internal policy server; and providing information to said bridge device to at least one of (a) connect with said at least one IP device to manage, audit and troubleshoot said at least one IP device, (b) join said session or (c) perform session management operations.

14. The one or more non-transitory computer readable storage mediums storing one or more sequences of instructions of claim 13, which when executed by one or more processors further causes providing information to said bridge device to obtain policy filters and input output (IO) masks from said OEM policy server or said internal policy server.

15. A computer implemented method for managing, auditing and troubleshooting of at least one IP device, said method comprising:

initiating a first secure connection with, or responding to a connection request from an admin device;

obtaining information associated with said at least one IP device from said admin device, wherein said information comprises an identity of said at least one IP device;

connecting to a device registry and downloading information associated with said at least one IP device, wherein said device registry stores said identity and access credentials of said at least one IP device to connect with said at least one IP device;

determining whether a connector to connect with said at least one IP device is installed in said bridge device;

communicating a request to said admin device and obtaining, from said admin device, (a) a uniform resource locator (URL) of a connector store, or (b) a location, from where a connector to connect with said at least one IP device is to be downloaded when said connector to connect with said at least one IP device is not installed in said bridge device;

downloading and installing said connector to connect with said at least one IP device as a plug-in module in said bridge device;

forming or joining a second secure connection with said agent device to manage, audit and troubleshoot said at least one IP device;

forming, on approval from said admin device, a third secure connection, using said connector, between said bridge device and said at least one IP device;

securing and relaying information from said second secure connection to said third secure connection when said second secure connection and said third secure connection are connected together, wherein said information is secured end-to-end to prevent tampering, wherein said bridge device restricts session participants other than those using said agent device from accessing said information unless said agent device allows said session participants to interact with said at least one IP device, based on rules enforced by policy filters; and obtaining, using said admin device, said policy filters and one or more input output (IO) masks and providing said policy filters and said one or more IO masks to said connector to manage, audit and troubleshoot said at least one IP device.

16. The computer implemented method of claim 15, further comprising breaking said third secure connection when said second secure connection is broken down for any reason, wherein said third secure connection is a slave of said second secure connection.

17. The computer implemented method of claim 15, further comprising (a) automatically re-initiating said third secure connection when said second secure connection is up and said third secure connection is down and (b) notifying said admin device and said agent device, and performing further actions to re-initiate said third secure connection based on at least one of (a) instructions received from said admin device or (b) a request received from said agent device.

18. The computer implemented method of claim 15, further comprising listening into a session and recording said session using a monitoring, recording and supervising server unless said agent device approves an additional interaction with said at least one IP device.

19. The computer implemented method of claim 15, wherein said policy filters comprise said decision tree, wherein said decision tree determines how said session participants interact with said at least one IP device, wherein an interaction with said at least one IP device comprises at least one of said commands or requests that are communicated by said session participants.

20. The computer implemented method of claim 15, wherein said one or more IO masks control visibility of said information from said session participants, wherein said one or more IO masks determine what commands or requests are visible in said admin device, said bridge device, or said monitoring, recording and supervising server when said information is transferred from said agent device to said at least one IP device, wherein said one or more IO masks determine what said information is visible in said agent device, said bridge device, said admin device or said monitoring, recording and supervising server when said information is returned from said at least one IP device to said agent device.

* * * * *